United States Patent [19]

Swander

[11] Patent Number: 4,465,323

[45] Date of Patent: Aug. 14, 1984

[54] RAILROAD NET BRAKING RATIO VALVE

[75] Inventor: Kenneth D. Swander, Lansing, Ill.

[73] Assignee: Hadady Corp., Lansing, Ill.

[21] Appl. No.: 352,142

[22] Filed: Feb. 25, 1982

[51] Int. Cl.$^3$ .............................................. B60T 8/18
[52] U.S. Cl. .................................... 303/23 R; 303/83
[58] Field of Search ................ 303/23 R, 23 A, 22 R,
303/22 A, 68–69, 80, 81, 82, 64–65, 83, 70, 86,
85, 78, 60, 39

[56] References Cited

U.S. PATENT DOCUMENTS

| | | | |
|---|---|---|---|
| 3,338,639 | 8/1967 | Carothers | 303/22 R |
| 3,341,257 | 9/1967 | Weber, Jr. | 303/22 R |
| 3,671,086 | 6/1972 | Scott | 303/22 R X |

Primary Examiner—Douglas C. Butler
Attorney, Agent, or Firm—Donald E. Egan

[57] ABSTRACT

An empty or loaded railroad brake control device includes a valve adapted to communicate a brake cylinder pressure chamber with a supplemental volume reservoir when the railroad car is not fully loaded. The valve is held in the closed position by a spring, but when a car is less than fully loaded, a load sensing device determines the relative position of the sprung and unsprung portions of the vehicle and transmits this information to the valve which opens to communicate the supplemental volume reservoir with the brake cylinder pressure chamber. The valve includes a pressure release valve, adapted to release the pressure from the supplemental volume reservoir when the brakes are released. An overpressure valve permits partial build-up of the pressure in the brake cylinder before the supplemental volume reservoir is connected.

1 Claim, 3 Drawing Figures

TO BRAKE CYLINDER LINE

TO BRAKE CYLINDER LINE

RAILROAD NET BRAKING RATIO VALVE

The present invention relates to a brake control device adapted to vary the degree of brake force applied to a railway car in accordance with an empty or load condition of the car. The apparatus of the present invention comprises a two position control device for either connecting brake cylinder pressure chamber to or isolating it from a supplemental volume reservoir and correspondingly affecting the level of air pressure established in the brake cylinder. The change-over of the control device from the empty position to the load position and vice versa is affected at a percentage of full load through a load sensing means, such as an arm, which senses the amount of truck spring deflection caused by the vehicle load. The present invention provides that, in the event the control device fails or the load sensing means is rendered inoperative for any reason, the supplemental volume reservoir is isolated from the brake cylinder pressure chamber and full braking is applied to the vehicle.

The present invention thus provides a valve capable of providing several fluid circuit functions connected by one line interposed in a position between sprung and unsprung members.

PRIOR ART

Many types of brake control systems of the empty or load type have been heretofore known and used for automatically reducing the degree of braking on railway cars carrying a relatively light load as compared to cars carrying relatively heavy loads, for the purpose of avoiding excessive braking on wheels of the relatively lightly loaded cars and consequent sliding on the wheels. Sliding of the wheels of railway cars is objectionable because of the resultant development of flat spots on the wheel treads and the high maintenance costs of turning the wheels to remove the flat spots. Heretofore most known types of empty or load brake control apparatus comprise a so-called changeover valve device and strut cylinder, the latter being a device for measuring the degree of load carried on a car according to the relative heights of sprung and unsprung parts of the car or the car truck. Such heretofore known types of empty or load brake control apparatus have been relatively complicated in nature and relatively high in initial cost and expensive to repair and/or maintain.

Although the prior art has described somewhat simpler devices, such as in U.S. Pat. No. 3,338,639, the present invention represents an improvement thereover in that the present invention provides a direct acting control device which provides for full braking should any failure occur in the operation of the empty or load brake control device of the present invention.

The problem with many prior art empty or load brake control devices is that they are heavy, cumbersome and require considerable piping. Secondly, the installation of these devices cannot be located in such a position to read true static deflection of the springs in proportion to weight. As a result, their reliability is affected by truck swing, track curvature and/or rock and roll of the sprung member.

The use of highly developed hardware such as ball bearings, equalizing cable and tension spring have been combined into this invention to solve the above problem.

The present invention generally comprises a supplemental or compensating volume which is selectively connected with or disconnected from the brake cylinder pressure chamber under control of a control device in a position to sense the relative loading of the car.

The primary purpose of the present invention is to provide an improved empty or load brake control apparatus wherein the load condition of the car is sensed by a load sensing means, which in turn transmits the load condition to the brake control device, which in turn regulates the degree of brake application as between full brake force—used for loaded cars, and reduced brake force—which is applied for unloaded cars. The brake control device of the present invention finds particular utility in "unit trains" in which all cars by design are either totally loaded or totally empty. The brake control device of the present invention may be mounted on the underframe or on the bolster and the load sensing means may be attached to or abut a member such as the brake beam or the side frame.

The brake control device of the present invention is normally in the closed position, indicative of a car in a loaded condition. In the loaded condition, the supplemental volume or reservoir is isolated from the brake cylinder volume and air pressure applied to the brakes in this condition will provide "full" braking force. When the car is empty (or less than 35% loaded), the load sensing device senses the change in spring deflection and the brake control device connects the supplemental volume or reservoir to the brake cylinder which causes applied air pressure to be distributed between the brake cylinder and the supplemental volume or reservoir, thus effectively reducing the braking force applied to the brakes for each light or partially loaded car. Although the brake control device is designed to open when car is empty or less than 35% loaded (at which time the braking force is reduced) it is desired that the valve remain fully closed (to permit full braking) when 50 or 60% of the rated load is present in the car. This configuration will provide full braking force for fully loaded cars even when the cars are swaying and rocking on the rails. Similarly, this configuration will provide reduced braking for cars with low loads even when the cars are swaying and rocking on the rails. Thus when the brake control device of the present invention is used on cars employed as unit train cars, the changeover of the valve device from one position to the other is effective at approximately 40% of full load to be carried by the car. Thus inadvertent, undesired operation of the valve device due to bouncing of the vehicle is thereby avoided.

It will be understood that the effective pressure applied to the brake cylinder, resulting from supply of fluid under pressure from the auxiliary reservoir on the car, incidental to a brake application is of course less when the supplemental volume is connected to or added to the brake cylinder pressure chamber volume, than when it is disconnected therefrom. As is more fully described hereinafter, the arrangement is such as to effect a change from the relatively high or full brake cylinder pressure characteristic of the "full" load to a relatively lower brake cylinder pressure whenever the load on the car reduces to a certain percent, such as 40% of full load of the car. Moreover the arrangement is that of simplicity in that it is not necessary to effect an emergency brake application to cause the changeover of the empty and load brake control valve.

A better understanding of the present invention may be had from the drawings in which:

FIG. 3 is a side view, taken in section along line 2—2 of the brake control device of the present invention.

DESCRIPTION AND OPERATION

Figure 1:
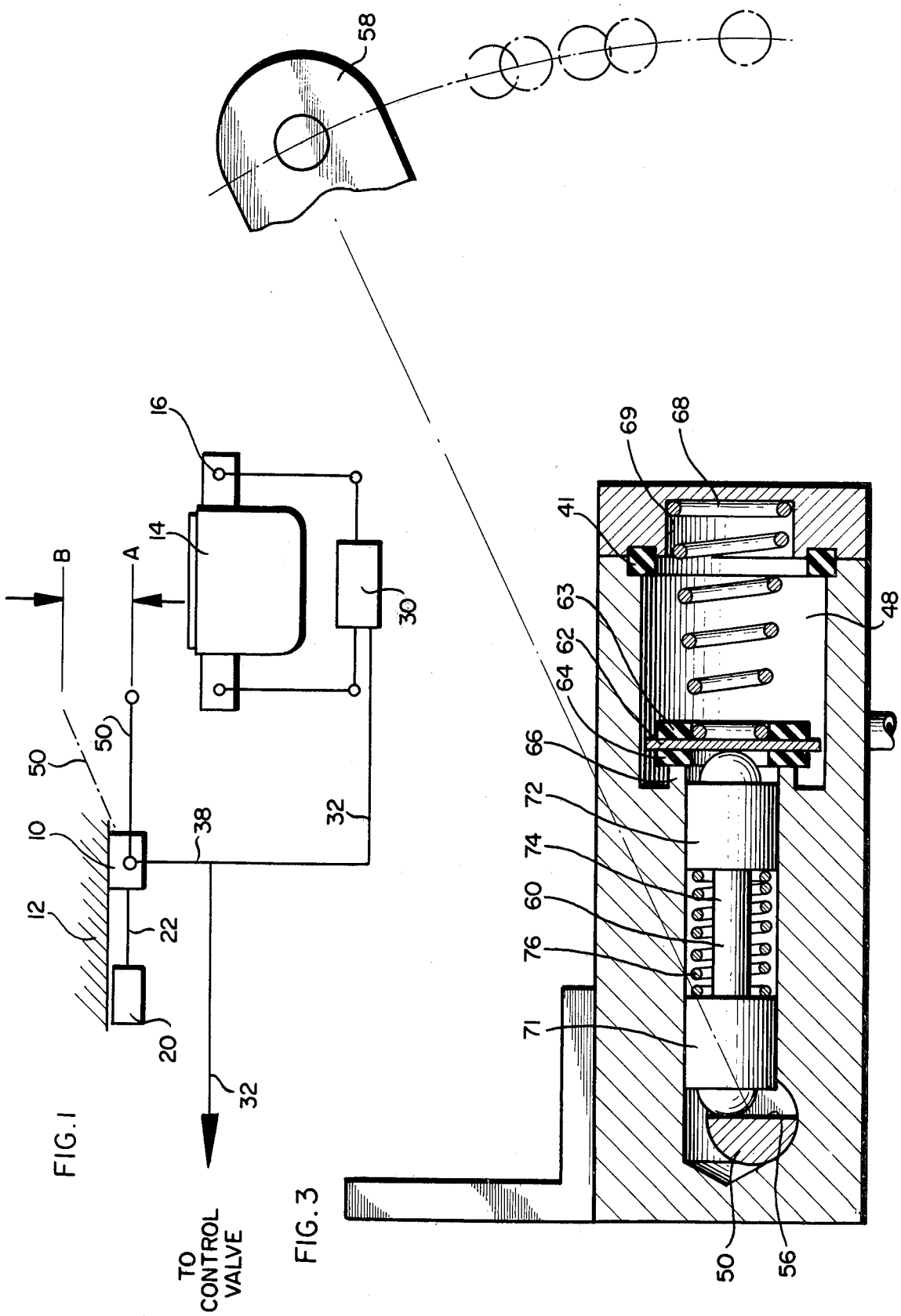
FIG. 1 is a schematic diagram of the brake control system with the brake control device of the present invention installed therein.

The brake control device of the present invention, as shown in FIG. 1, comprises brake control device shown generally at 10 which is preferably mounted to car underframe 12. The brake control device 10 communicates with reservoir 20 preferably through reservoir line 22. Alternatively, the reservoir 20 may be directly coupled to or be made a part of the brake control device 10.

Load sensing arm 50 is attached to brake control device 10 and is adapted to sense the deflection of the springs caused by the load in the car. As the springs are deflected, arm 50 moves from position A to position B.

The brake setup depicted in FIG. 1 is generally conventional in that a brake cylinder 30 is suspended beneath bolster 14 by fulcrum brackets 16. Air prressure from brake cylinder pipe 32 is connected to the pressure chamber of the brake cylinder 30 and is adapted to cause the brake cylinder to apply braking forces to the wheels of the vehicle (not shown).

Brake cylinder line 32 is connected to a control valve, not shown, which provides air from the auxiliary and emergency reservoirs (not shown) to operate brake cylinder 30. The control valve, which may be of any conventional type, permits the operator of the vehicle to apply the brakes of the vehicle by opening the control valve and permitting the air in either the auxiliary and/or the emergency reservoirs to be fed to the brake cylinder.

As is shown in FIG. 1, brake cylinder line branch 38 connects brake control device 10 with the brake cylinder pipe 32. Brake cylinder control device 10 comprises a valve which is normally closed, but which, under selected operating conditions, opens to connect a supplemental volume reservoir 20 through pipe 22 and brake control device 10 with brake cylinder pipe branch 38. Thus when the pre-selected operating conditions are such that the valve in the brake control device 10 is open, the supplemental volume reservoir 20 is added to the volume of the pressure chamber of brake cylinder 30 causing the reduction of the effective pressure on brake cylinder 30.

In operation, the brake cylinder operating device 10 includes a load sensing means, 50, which functions to sense the relative loading of the vehicle. As is shown in the drawings, the load sensing means 50 is preferably an arm adapted to sense the relative loading of the car through the compression of the springs, i.e., the relative position of the sprung portion of the car as compared to the unsprung portion is sensed and transmitted to the brake control device 10.

When the car is less than fully loaded, reservoir 20 is coupled with brake cylinder 30 through the brake control device 10, thus providing an increased effective volume for the brake cylinder. When air from either the auxiliary reservoir or the emergency reservoir is communicated via a control valve, the air is distributed over a larger volume, and accordingly lower braking forces are applied to the car.

However, when the car is in the loaded condition, the brake control device is in its normal position, i.e., the valve is closed, and the supplemental reservoir 20 is isolated from the main braking system. In this condition, when air from the auxiliary reservoir or the emergency reservoir is applied by the control valve, all of the air is delivered to the brake control cylinder, thus providing the standard maximum braking force.

Figure 2:
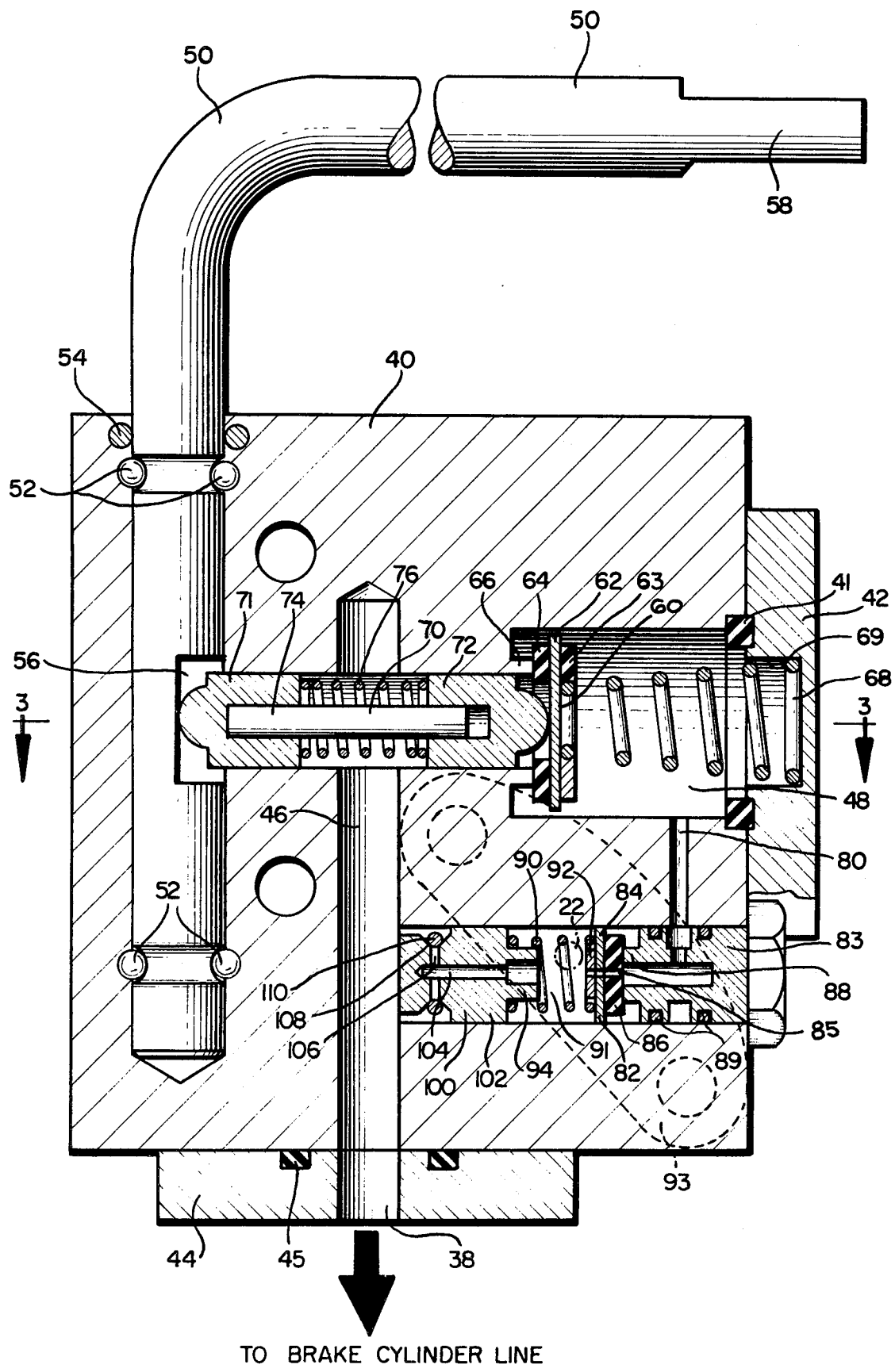
FIG. 2 is a top view or plan view of the brake control device taken in section along line 1—1.

The specific structure of the brake control device of the preferred embodiment is illustrated in FIGS. 2 and 3. As shown therein, the brake control device generally comprises body 40, chamber 48, and coverplate 42, which defines the wall of chamber 48 which is sealed with seal 41 and is held in place by bolts (not shown).

The lower end of load sensing arm 50, which has a circular cross-section, is mounted in body 40 and is held in place by ball bearings 52 which lock arm 50 in body 40 and provide bearings for the rotation of arm 50. Air pressure integrity is maintained with sealing ring 54. Within body 40, a flattened section of load sensing arm 50 comprises a cam surface 56 adapted to operate the check valve shown generally at 60, and open the normally seated check valve 60 as is more fully described below. The upper end 58 of the load sensing arm 50 is connected to a portion of the truck wherein it is adapted to sense the relative spring deflection, based on the load of the car.

The closed check valve, shown generally at 60, comprises a valve plate 62 to which is bonded a resilient member 64 adapted to mate with valve seat 66 to form an airtight seal. Valve plate 62 is held in the closed position by spring 68 which is maintained under compression in chamber 48 and which is held in position by washer 63, secured to valve plate 62 and indentation 69 in cover plate 42.

Check valve 60 is opened by the push rod assembly 70 which comprises two fluted stem halves 71 and 72, each of which has a centrally disposed opening therein adapted to receive rod 74. Stem halves 71 and 72 are urged apart by spring 76 which is under compression. Push rod assembly 70 is thus adapted to maintain constant contact between cam surface 56 (through stem half 71) and valve plate 62 (through stem half 72) and thus push rod assembly 70 avoids movement or impact caused by vibration when the car is either in the light condition or in the loaded condition.

As the car is lightened, load sensing arm is rotated and cam face 56 rises, bearing on stem half 71, which moves stem half 71 toward stem half 72, thus compressing spring 76. As stem half 71 is moved toward stem half 72 spring 76 compresses. As the separation of the stem halves diminishes and contact is made with rod 74, i.e., the push rod assembly 70 goes solid, and the push rod assembly 70 unseats check valve plate 62 from seat 66.

Body 40 includes opening 46 which communicates with brake cylinder branch pipe 38 through cover plate 44. Air pressure integrity between body 40 and cover plate 44 is maintained with sealing ring 45. Thus, as check valve 60 opens through operation of push rod assembly 70, the brake cylinder branch line 38 is connected through opening 46 through fluted stem half 72 and past valve 62 to chamber 48.

In the preferred embodiment chamber 48 communicates via a passageway 80 with overpressure valve assembly 82. The overpressure valve assembly includes the valve body 83 which is cylindrical in shape and is fitted into an opening in body 40. A central opening in valve body 83 communicates with opening 80 and is maintained airtight with seals 89. The overpressure valve assembly 82 generally comprises a plate member 84 having bleeder hold 85 disposed therein. Affixed to plate 84 is resilient member 86 adapted to form an airtight seal with valve seat 88 between passageway 80 and chamber 91. Spring 90, which is under compression, maintains plate 84 and resilient member 86 in airtight connection with valve seat 88. Spring 90 is maintained in position by washer 92 which is secured to plate 84 and projection 94. The supplemental volume reservoir is attached through pipe 22 to chamber 91, and may be secured thereto using pad 93, shown in FIG. 2.

The compressive force on valve spring 90 is preferably adjusted to cause opening of plate 84 and resilient member 86 when a pressure differential of approximately 12 psi is obtained. When the overpressure valve assembly 82 opens, by movement of plate 84 and resilient member 86 away from valve seat 88, the brake cylinder branch pipe 38 is communicated via opening 46, through check valve 60 into chamber 48, and via passageway 80 through overpressure valve 82 to chamber 91 and through reservoir line 22 (shown in phantom in FIG. 2) to reservoir 20.

In the preferred embodiment, the 12 psi setting on the overpressure valve assembly 82 enables the operator of the train to apply 12 pounds of pressure to the brake cylinder, and thus take up the slack of the brakes (i.e., the space between the brake shoe and the wheel) before the brake cylinder volume is increased by connection with the reservoir 20.

When the brakes are released, pressure release assembly 100 allows the pressure from the reservoir 20 to bleed back into the brake cylinder branch pipe 38. Pressure release assembly generally comprises a valve stem 102 with a central opening 104. Radial openings 106 communicate the central opening 104 with an annular notch 108. A resilient O-ring 110 is disposed in annular notch 108. The pressure release assembly 100 thus permits the pressure from the reservoir 20 to be bled back to chamber 91 and then into opening 46 and thence to brake cylinder branch pipe 38, but assembly 100 resists the flow of air from the brake cylinder branch pipe 38 into chamber 91 or into the reservoir 20.

It will be apparent to those skilled in the art that many variations may be made on the foregoing embodiments to accommodate various needs, but the foregoing description comprises applicant's best mode of invention.

Another embodiment is to substitute a one piece push rod assembly for that shown and described above. Further, a one piece push rod assembly may be permanently affixed to the plate to produce a structure which is more economically manufactured. Alternatively, the plate 62 may be a one piece molded part with resilient member 64 and positioning washer 63 integrally molded therein.

The overpressure valve assembly 82 may be omitted if desired, but it is contemplated by the preferred embodiment.

In a multiple unit freight car having a 70 ton truck with D-5 spring at the "A" end, a center articulated 100 ton truck with D-7 spring, and a 70 ton truck at the "B" end, the arrangement of the brake cylinder system is critical if weight is to be held to a minimum.

With a truck mounted brake having two cylinders per truck or a total of six cylinders for a 2-unit multiple car, it is essential to have three cylinders and an equalizing volume reservoir connected directly to the car control valve, at the "B" end and to have an extension of this line or pipe to act as a control or signal to a relay in order to control the other three cylinders in the system. The need for the relay and a separate supply reservoir is due to the limited capacity of the primary control valve and fixed volume of the auxilary and emergency reservoir (which is a standard for all other cars in the train).

The load or empty brake control device of the present invention, located at the center 100 ton truck with D 7 springs (having long travel), can be used to control all cylinders with a very minimum of weight and a single branch pipe connection. This is only one example of special application of the brake control device of the present invention, as those skilled in the art will recognize.

The brake control device of the present invention may be mounted in a variety of different configurations, it only being essential that the load sensing arm be positioned to sense the relative loading of the car. It is contemplated that the valve body will generally be mounted directly to the car underframe with the reservoir spaced therefrom. Alternatively, the valve may be mounted directly on the reservoir and thus to the car underframe, eliminating the need for another pipe connection.

Alternatively, the valve could be mounted on a member of the truck and provided the load sensing arm was connected to the car underframe or some other body, the brake control valve could be configured accordingly.

The forms of invention herein shown and described are to be considered only as illustrative. It will be apparent to those skilled in the art that numerous modifications may be made therein without departure from the spirit of the invention or the scope of the appended claims.

I claim:

1. An empty or loaded brake control device for a railroad vehicle having sprung and unsprung portions, said brake control device comprising:

a brake cylinder having a pressure chamber adapted to operate under the influence of air pressure;

a supplemental volume reservoir;

a check valve means adapted to communicate said brake cylinder pressure chamber with said supplemental volume reservoir upon opening, said check valve means being held in the closed position by compressed spring means;

an overpressure valve, resiliently biased into the closed position, which permits a partial buildup of pressure in said brake cylinder pressure chamber before the supplemental volume reservoir is communicated with said brake cylinder pressure chamber;

a load sensing means adapted to sense the relative position of said sprung and said unsprung portions of said railroad vehicle;

means to transmit information as to the relative position of said sprung and said unsprung portion of said vehicle from said load sensing means to said check valve means, and cause said check valve means to open and communicate said brake cylinder pressure chamber with said supplemental volume reservoir when said vehicle is less than fully loaded; and a pressure release valve adapted to release the pressure from said supplemental volume reservoir upon release of the brakes of said vehicle independent of the position of the load sensing means.

* * * * *